Nov. 4, 1947.  E. D. GOODWIN  2,430,121
OPTICAL SYSTEM FOR COLOR PHOTOGRAPHY
Filed Nov. 3, 1944  4 Sheets-Sheet 1

Ellis D. Goodwin,
INVENTOR

Nov. 4, 1947.　　　　E. D. GOODWIN　　　　2,430,121
OPTICAL SYSTEM FOR COLOR PHOTOGRAPHY
Filed Nov. 3, 1944　　　　4 Sheets-Sheet 2

Ellis D. Goodwin,
INVENTOR

BY Victor J. Evans & Co.
ATTORNEYS

WITNESS

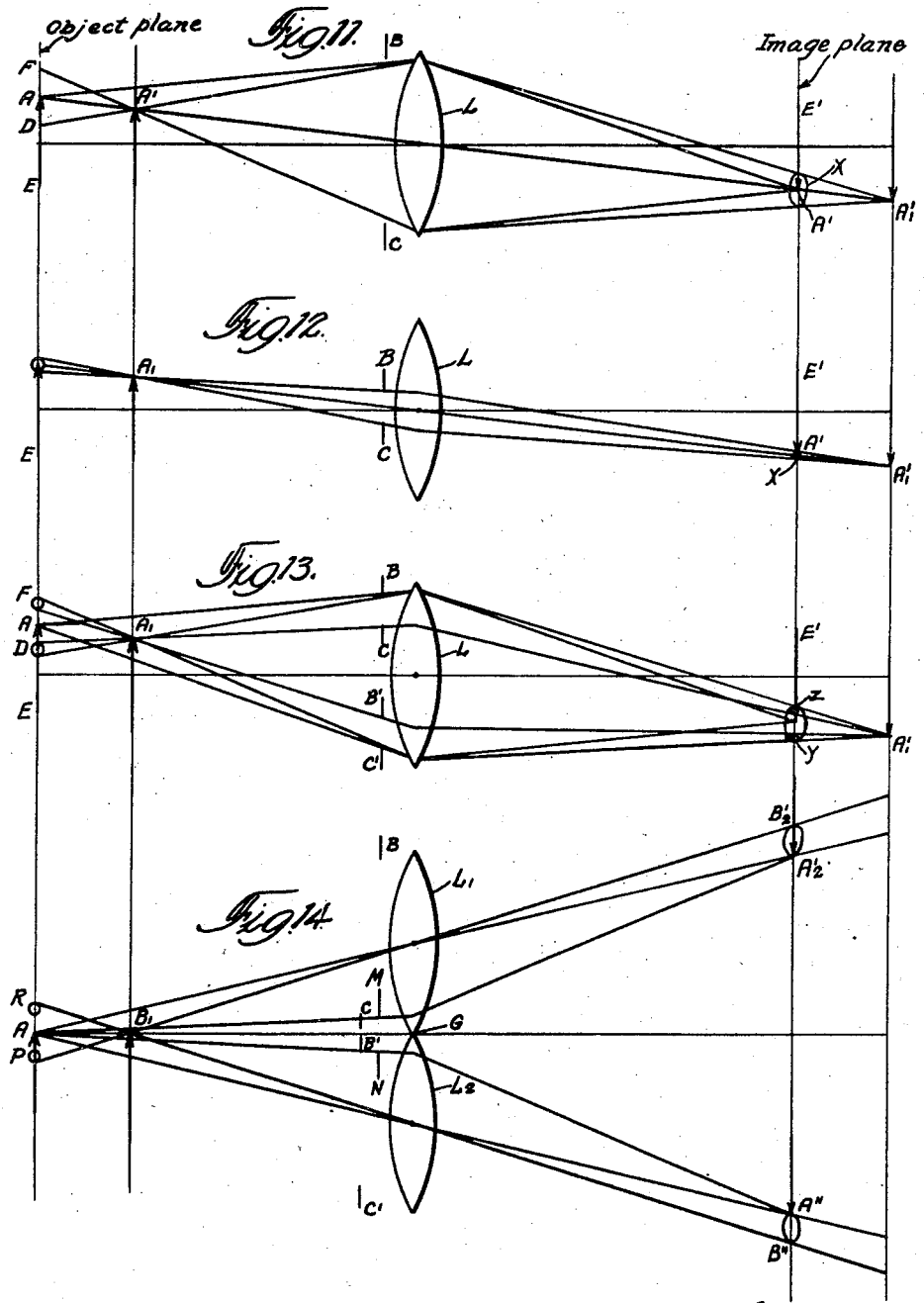

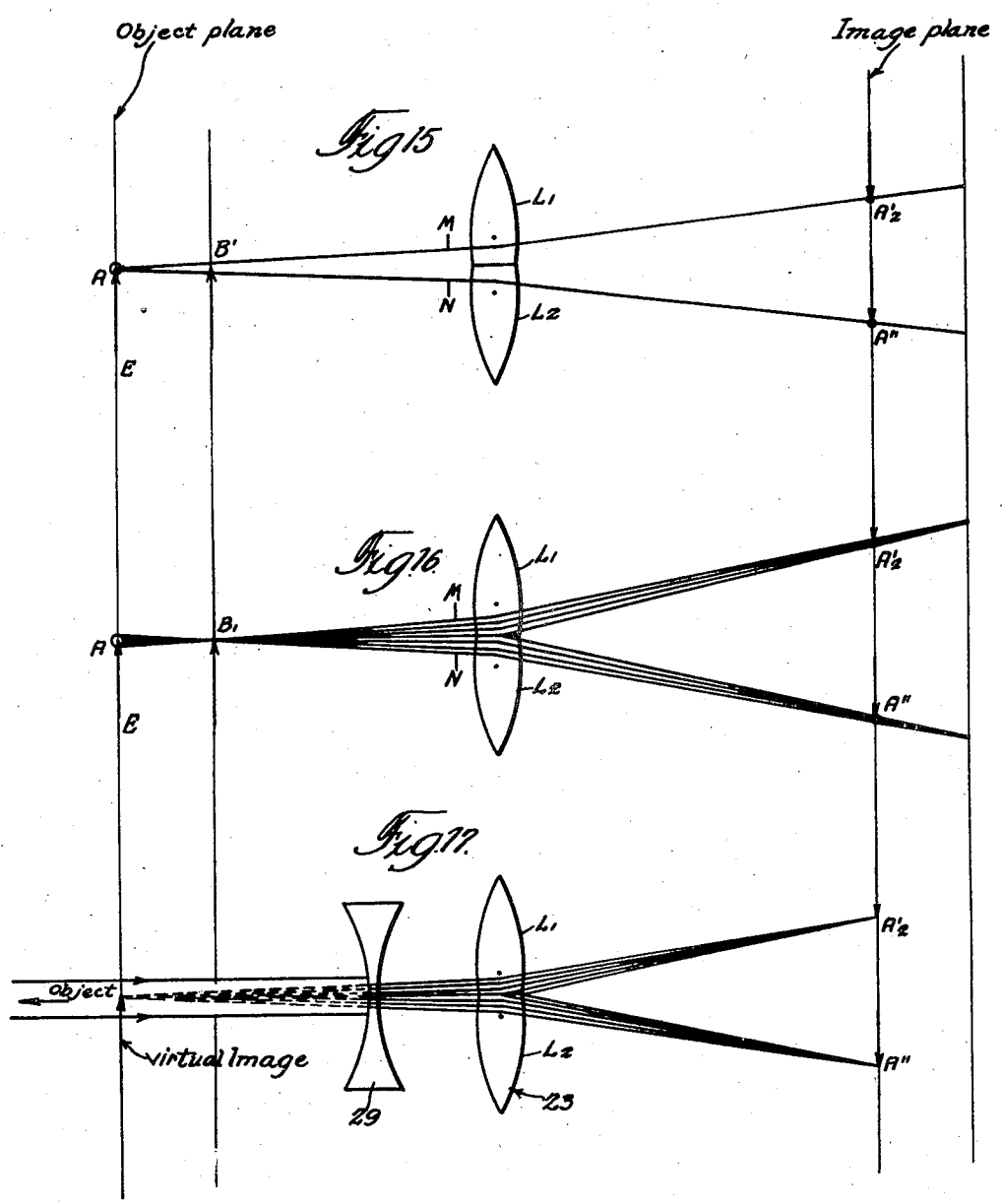

Patented Nov. 4, 1947

2,430,121

UNITED STATES PATENT OFFICE 2,430,121

OPTICAL SYSTEM FOR COLOR PHOTOGRAPHY

Ellis Donald Goodwin, Sioux City, Iowa

Application November 3, 1944, Serial No. 561,684

6 Claims. (Cl. 88—16.4)

This application is a continuation in part of my copending application Serial No. 389,800, filed April 22, 1941, and entitled Photographing device.

This application relates to systems and apparatus for photographing and projecting pictures, more particularly to color photographing and projecting systems and apparatus in which a plurality of black and white images are produced on a single negative in a photographic device and are projected in a projector to give a colored picture, and it is an object of the invention to provide an improved system and apparatus of the character indicated.

It has been proposed to photograph objects in their natural colors onto a negative or positive film in which a multiplicity of color-sensitive layers are used on the film. Such systems are not satisfactory in that the different colored images tend to dissolve into each other and produce faulty final colors. In addition, it is difficult to regulate the sensitivity of the different color layers to take care of the fact that light, in passing through the color layers, loses some of its effect. It has also been proposed to photograph an object separately onto a plurality of films, each one being sensitive to a different color, and after processing to superimpose the separate films to produce the colored film or print. This system has obvious disadvantages in matching the plurality of images properly and without distortion. Furthermore, the systems enumerated are laboratory systems in that highly skilled technicians must be employed and the conditions of processing, such for example as temperature, must be carefully regulated. Hence the practical aspects are beyond the layman interested in color photography. In contrast to the difficulties of color photography, black and white photography has reached a high degree of perfection and simplicity. The layman is quite capable of processing his own films and prints after he has exposed the film to the object to be photographed. To make use of the development of the advances in black and white photography in color photography, it has been suggested to expose a black and white negative through a plurality of lenses associated with color filters, so that a plurality of black and white images are obtained spaced adjacent each other on the film. The resultant negative in black and white is processed to produce a positive which is projected through an identical lens system also associated with appropriate color filters. The lens system superimposes the several images to form one image, and the image from each lens, having been formed through a color filter and being projected through a color filter, produces a colored image from the black and white positive. The superposition of the several differently colored images results in a final image of natural color.

Systems using ordinary black and white film have the obvious advantage of simplicity in processing but they have not been wholly satisfactory because of the distortion in the final picture. Very largely this has been due to imperfections and defects in the lens system. This is readily perceivable by those skilled in this art. The use in any system of a plurality of lenses is difficult because of the inherent limitations of the lenses, such as spherical aberration. Added to this are the special photographic problems of depth of focus, amount of light absorbed by each lens and its color filter, and the fact that small distortions, while not objectionable in black and white films, are undesirable in color films. Accordingly, it is a further object of the invention to provide an improved lens system for color photographic apparatus of the character indicated.

It is a further object of the invention to provide photographic apparatus including a lens system having a large depth of focus.

It is a further object of the invention to provide photographic apparatus of the character indicated which is free from the effects of lens aberration.

In carrying out the invention in one form, photographic apparatus including an optical system having a series of lenses is provided. More particularly, the series of lenses comprises a concave lens for forming a virtual image of an object and a plurality of convex lens sectors for forming a plurality of real images of the virtual image. The convex lens sectors are substantially coplanar with their edges contiguous and have their respective optical centers closely adjacent each other.

For a more complete understanding of the invention, reference should be had to the accompanying drawings in which:

Fig. 11 is a schematic view of a lens and the images formed thereby of objects placed at two points in front of the lens;

Fig. 12 is a view similar to Fig. 11, but with a small iris opening at the center of the lens;

Fig. 13 is a view similar to Fig. 11, but with a pair of iris openings at the edges of the lens;

Fig. 14 is a schematic view of a pair of contiguous lenses and the images formed thereby of objects placed at two different points in front of the lenses;

Fig. 15 is a view similar to Fig. 14 but with a plural lens and with a small iris opening in front thereof;

Fig. 16 is a view similar to Fig. 15 but with a plurality of rays projecting from an object; and Fig. 17 is a view similar to Fig. 16 but with a convex lens placed before the plural lens.

Figure 1:
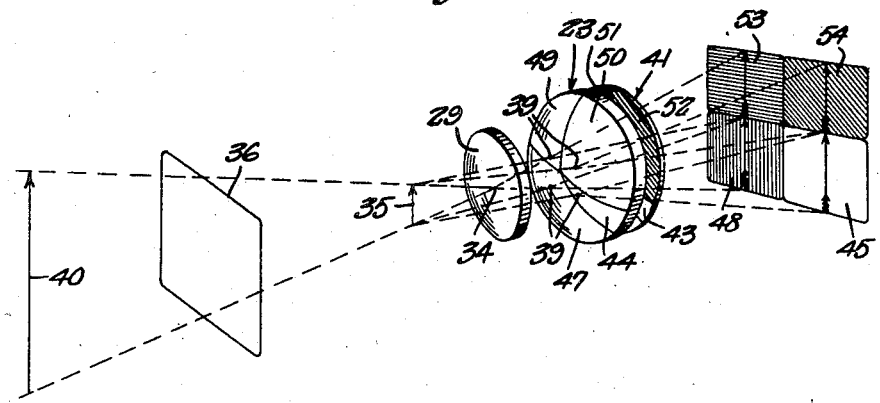
Fig. 1 is an exploded diagrammatical view of a photographic system embodying my invention.

In the accompanying drawings, wherein for the purpose of illustration is shown a preferred embodiment of my invention, the numeral 10 designates a camera housing having the conventional lens barrel 11. The housing has provision at the opposite ends thereof for rotatably supporting transversely extending spools 12, which spools are removably secured within the housing and are adapted to carry a suitably sensitized film 13 which may be progressively drawn across the inner opening 14 of the lens barrel. The barrel is constructed in two parts, the inner part 15 being formed with an inner annular flange 16 and the outer part 17 thereof being formed with a longitudinal annular flange 18 snugly receiving the distal end of the inner part 15. An iris diaphragm 19 is mounted between the abutting wall portions of the connected parts of the barrel and it may be manually actuated to regulate the internal opening 21 by means of the finger piece 20. The iris diaphragm 19 is used to limit the light passing through the lens system and to confine the rays forming the plurality of images to an aperture no greater than that of a conventional camera lens of equivalent focal length, thus eliminating parallax, as will be explained. The iris diaphragm may be located in front of the lens system between groups of the lens system or behind the lens system. If the diaphragm is to operate in the most efficient manner, it should have an essentially wide series of openings which range from substantially the internal diameter of the barrel to a tiny pin point in size.

In order that the light passing through the barrel may be properly focused on the sensitive surface of the film 13, I have provided a lens system consisting of two groups of lenses 22 and 23 of which lens group 22 is movable relative to lens group 23. Lens group 22, which may be termed the objective lens, is a negative lens so that it forms a virtual image, illustrated by arrow 35, of the object being photographed, in front of the lens group 23, the virtual image always being focused at the same distance from the combination lens 23, which is a positive lens. The combination lens 23 is mounted within the inner part 15 of the barrel for projecting the virtual image 35 onto the film. The combination lens is securely held in pressed engagement with the inner surface of the flange 16 by an annular retaining ring 24 or the like, and is fixed in position relative to the film 13.

Figure 3:
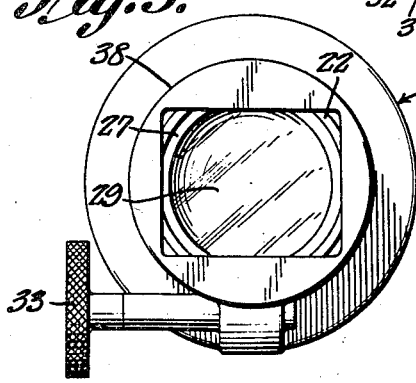
Fig. 3 is a front elevational view of the lens barrel of the camera shown in Fig. 2.

The objective lens includes an outer sleeve 25 formed at one end thereof with an inturned annular flange 26 which cooperates with the retaining ring 27 in holding the lenses 28 and 29 in proper association with each other and with the sleeve. The outer periphery of the sleeve is formed with a rack 30 and a pinion 31 cooperates with the rack for sliding the sleeve longitudinally within the barrel and relative to the combination lens. As best illustrated in Fig. 3, the pinion is fixedly secured to one end of a shaft 32, the other end of which shaft extends laterally of the barrel and is provided with a knurled handle 33 which permits ready manual rotation of the pinion. It is to be understood that the above-described rack and pinion mechanism for shifting the objective lens longitudinally of the barrel merely comprises a preferred means, it being obvious that any suitable actuator means may be substituted therefor.

The objective lens is illustrated as a multiple lens consisting of two parts 28 and 29. It is well understood in this art that such multiple lenses are used to decrease aberration and other distortions which are present in a single lens. The complete lens is a negative lens so that the image formed by the lens is a virtual image 35 in front of the lens. To make the lens group a negative lens the lens 29 is concave as shown, the lens 29 having an optical center 34. The purpose of using a negative lens is to enable an arrangement of sectors of the combination lens 23 to be used in which the optical centers of the lens sectors are spaced very close to each other. This results in the advantage of being able to use a small iris opening at all times with the resultant large depth of focus essential for good pictures. As will be more fully described, the negative lens 29 can be focused to produce a virtual image of the object at the same place, 35, irrespective of the distance of the object from the lens.

Figure 2:
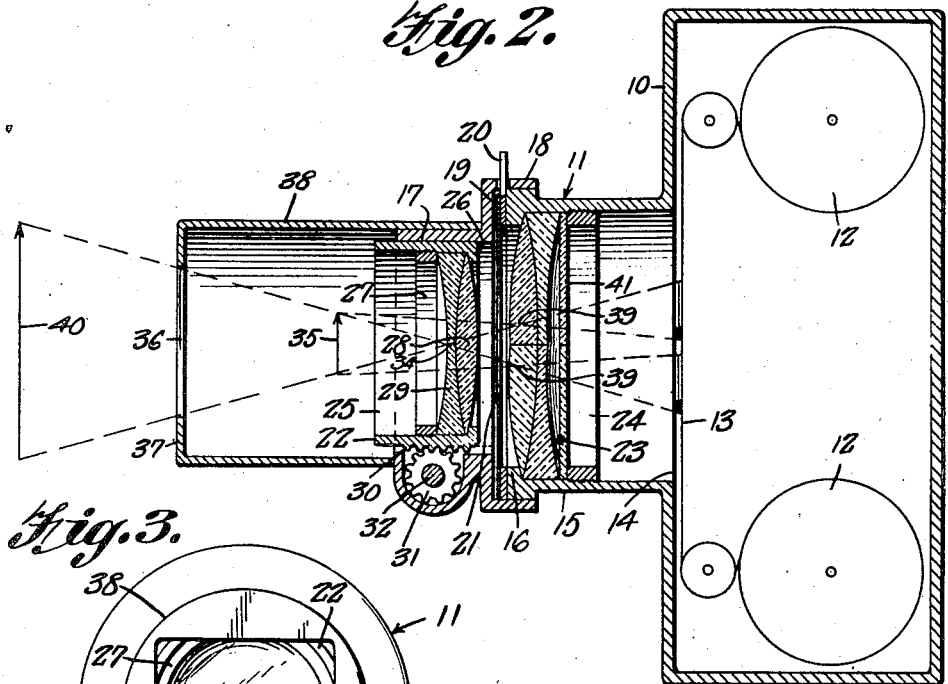
Fig. 2 is a vertical sectional view of a camera embodying the photographic system of Fig. 1.

The size and form of the image 35 is determined by the size and form of the opening 36 in the end wall 37 of the mat box 38 and the focal length of the objective lens. The aerial or virtual image may be at any fixed distance from the sensitized film, it may lie inside or outside the mat box opening and may range in size from a minutely small image to an image the size of the object being photographed. For example, an objective lens ground with little curvature would form the virtual image at nearly the distance of the object being photographed, yet it would fix the distance from the film to the virtual image and would thus permit the combination lens to form four identical images when photographing, as will be apparent later in this specification, and permit the combination lens to superimpose the four images at line 35 during projection. As best illustrated in Fig. 2, the open end of the mat box snugly receives the extending barrel part 17 and, when thus attached to the barrel, the wall 37 will be disposed a substantial distance in advance of the objective lens. Obviously, both the size and shape of the image 35 will be determined by the size and shape of the opening 36 and by the distance between the opening and the optical center 34 of the objective lens, and the focal length of the objective lens. For the purpose of the present invention, the opening 36 is preferably of rectangular formation in plan; however, it is to be understood that I do not wish to restrict the shape of this opening to any particular shape.

Figure 4:
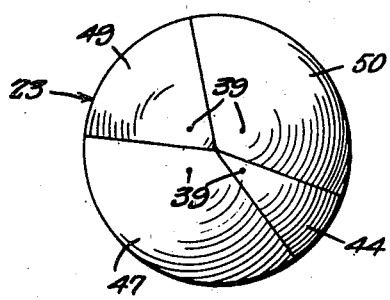
Fig. 4 is a top plan view of a combination lens constructed in accordance with the present invention.
Figure 8:
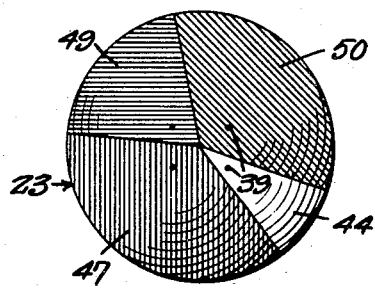
Fig. 8 is a top plan view of a combination lens similar to that illustrated in Fig. 4, except that the sectors comprising the same are tinted.

The combination lens 23 comprises a plurality of sectors having the adjacent sides thereof fixedly secured to each other by an opaque substance, which sectors may be of either clear or tinted glass. Fig. 4 illustrates the lens sectors as being formed from clear glass and Fig. 8 illustrates the same as being formed from tinted glass. In either event, the optical center 39 of each of the sectors is adapted to project the virtual image 35 onto the sensitized surface of the film 13. This operation is best illustrated in Fig. 1 wherein the line 40 illustrates the object to be photographed. Rays of light pass from the object 40 through the opening 36 in the mat box and into the lens 29 of the objective lens 22. By reason of the concave surface of this lens, light rays from the object are refracted to form the virtual image 35. Each sector of the combination lens 23 projects the virtual image 35 separately and distinctly onto the surface of the film, so that from the complete lens a plurality of closely spaced images are obtained.

Color filters of the same shape as the lens sectors are associated therewith, each lens sector having a different color filter. In the photographic system of the invention, using the different color filters with a plurality of lenses produces a plurality of images in black and white since black and white film is used, the exposure of the film being dependent on the intensity of the light and the filter factor of the particular filter as well as the emulsion factor of the film. In projecting the film to form a picture a similar color filter is used with each lens sector and the resulting image from that lens sector is colored with the color of the filter. Superimposing the different images then results in the final colored image. Different color filters absorb different amounts of light. This is measured by the filter factor. Since black and white film is being used it is apparent that the images from the different lens sectors will be of different density due to the amount of light filtered out by the particular color filter and due to the emulsion factor of the film which determines the intensity range of the light to properly expose the film. Thus, for example, a lens sector used with a color filter which absorbs only a small amount of light may be small, since sufficient light will penetrate through the lesser area to properly expose the film. With a particular film being used it is apparent that areas of the lens sectors will vary inversely with the amount of light absorbed by the filter, i. e., a filter absorbing a large amount of light requires a large area, and vice versa. The filter 41 comprises a plurality of sectors, the entire filter being of the same size as the combination lens and each sector thereof being of a size identical with the respective sector of the lens. Thus, if each sector of the filter is in register with its respective sector of the lens, only such colors as are capable of being passed by the respective filter sectors may be projected onto the sensitized surface of the film by its lens sector. The opening 36 of the mat box will permit the virtual image to have sharp and distinct edges.

Let us assume that the segment 43 of the filter is clear and in register with the sector 44 of the lens. The image projected by the optical center 39 of the lens sector 44 will be thrown onto the film in the block designated by the numeral 45 in Fig. 1. This image will comprise all of the colors contained by the object being photographed and will register as a black and white copy thereof. Let us further assume that the sector 46 of the filter is disposed in registering relation with the sector 47 of the lens and that the filter segment is colored red. The image projected onto the film by the optical center 39 of the lens sector 47 is designated by the numeral 48 in Fig. 1. The mentioned sector of the lens will project an image containing all of the colors contained by the object being photographed; however, the red filter disposed rearwardly thereof will permit only the red light to pass therethrough and onto the film, the image on sector 48 being black and white of density proportional to the red light. A similar situation exists for the sectors 49 and 50 of the lens. Suppose that the sector 51 of the filter is disposed in alignment with the sector 49 of the lens and that the sector 52 of the filter is disposed in alignment with the sector 50 of the lens. If the filter sector 51 is tinted blue and if the filter sector 52 is tinted green then, even though the image projected by the respective sectors 49 and 50 of the lens includes all of the colors contained by the object being photographed, only blue rays will be passed by the blue filter and only green rays will be passed by the green filter. The images recorded on the squares 53 and 54 will be black and white but the density of the black and white will be determined by only the blue or green portions of the object being photographed. The diameter of the diaphragm opening may be regulated to control the intensity of the light passing through the combination lens and this opening need be no greater than that of the conventional diaphragm of any camera having a lens of equal focal length.

Figure 7:
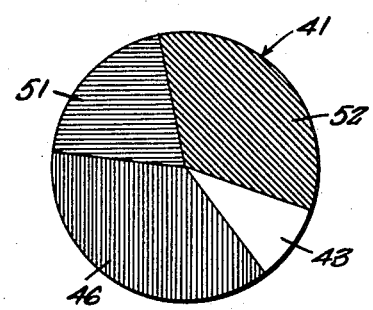
Fig. 7 is a top plan view of a combination filter adapted to be used in association with the lens illustrated in Fig. 4.

As illustrated in Fig. 8, the lens may be constructed of tinted glass whereby the filter 41 may be eliminated. Each sector is tinted a different color whereby to separately pass various of the colors contained by the object and in this case one sector of the lens would be clear to correspond to the clear sector of the filter 43 of Fig. 7. The black and white images projected onto the screen from the black and white image on the film resulting from the clear section of the lens or filter softens the colors of the image on the screen and produces pleasing effects, but clear colors are obtained without this clear section.

Figure 5:
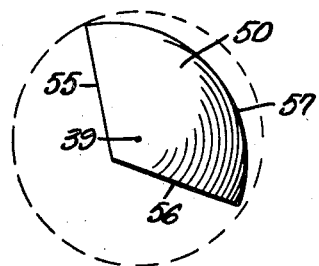
Fig. 5 is a view illustrating the manner in which one sector of the combination lens is cut from a single lens.
Figure 6:
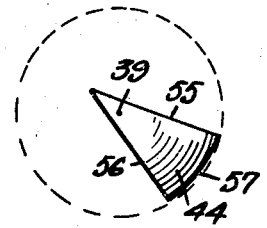
Fig. 6 is a view similar to Fig. 5 illustrating a smaller sector and showing the manner in which the sector is cut for proper interfitting and co-acting with the sector illustrated in Fig. 5.
Figure 9:
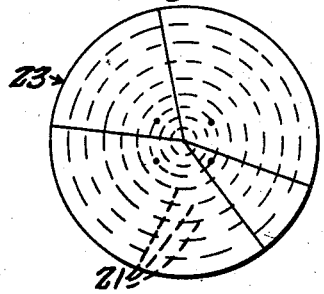
Fig. 9 is a top plan view of the lens illustrating the manner in which an iris diaphragm may be used to restrict the portion of the lens to be used.

In forming the sectors of the lenses, a separate lens is ground down for each sector. Figs. 5 and 6 best illustrate the manner in which this operation is performed. Let us assume that Figs. 5 and 6 represent the sectors 50 and 44, respectively, in Fig. 4. The angularly related edges 55 and 56 are ground to a requisite length required to properly locate the optical centers 39 equidistant from the principal axis of the lens. An arcuately curved outer edge 57 is then inscribed, which edge has a radius equal to the length of the adjacent edges 55 and 56. Each of the other sectors is similarly formed so that the optical centers 39 are equidistant from the principal or geometric axis, and in each case the adjacent edges 55 and 56 are formed of equal length and the arcuate edge 57 has the same radius so that when all of the various sectors are fitted together a single disk-shaped lens will be obtained.

It will be noted from the foregoing description of the lens construction that the optical centers of the lens sectors are closely adjacent each other. It is important that each lens sector have the optical center of the lens from which it was formed within the boundaries of the lens sector, so that the complete lens 23 has as many optical centers spaced around the geometrical center as there are sectors. It is an important feature of the invention that the optical centers of the lens sectors are close to each other. In Fig. 2 the spacing of the optical centers is shown to be about equal to the size of the images. The small spacing of the optical centers enables the use of a single small diaphragm or aperture which results in a lens system having an unusually large depth of focus without any image shift of the different colored images with the resultant distortion in the final picture. Using a negative lens to form a virtual image at the same distance from the optical centers of the lens sectors, irrespective of the distance from the image, enables the lens sectors to be arranged so that only the central portions of the lens are used, and this is done with an aperture no greater than the aperture for an ordinary lens even though in the invention a plurality of lenses are used.

When the film is developed and a positive obtained whether by a reversal process or by reprocessing the negative, the positive, in black and white, occupies the same position in a projector that the negative film occupied in the camera so that the positive may be projected onto a screen by means of a similar optical system in the projector. Obviously, the image passed by the green filter 52 onto the square 54 of the film will then be reversely projected through the green filter and corresponding lens sector and onto the screen in superposed relation with the corresponding parts of the black and white film projected from the block 45. The same is true of the blue and red parts of the object being photographed, inasmuch as these colors will be projected from the blue block 53 and the red block 48 and through the corresponding parts of the filter and lens. Of course, the colors of the lens or filters are not limited to those illustrated in the drawing, but it is thought that these colors, by way of example, effectively set forth the manner in which the combination lens operates to project separate colored portions of the object onto the film.

Referring to Fig. 1 it will be seen that four images 45, 48, 53 and 54 are formed by the four lens sectors of the object 40. The images are in black and white since ordinary black and white film is used. However, as pointed out heretofore, the density or shade of the black and white is determined by the color filter used so that the film has an image which is the negative of the particular color portion of the object transmitted by the particular lens sector. That is, if an object is colored red, for example, of a high intensity, then the image on the black and white negative will be quite dark but only as dark as the red light determines. Thus the film contains a plurality of images in varying intensities of black and white. The black and white negative is processed to produce a black and white positive. The positive of course will have light areas which are proportional to the dark areas of the negative. When the positive is projected in a projector, a similar lens system is used as is used in the camera. The lens system combines the plural images of the positive into a single image on the screen. The projected image, however, is a positive image and is in color. This is brought about by using color filters on the projector lens sectors which are similar to the camera color filters. Where the image on the negative was dark, from a red filter for example, the image on the positive is light and the color filter associated with it will, in the projector, allow a large amount of the red light coming through the positive to be transmitted through it, the amount being proportional to the positive density and hence a red image appears which has an intensity proportional to the intensity of the red in the object. Similarly for the other colors which are then combined to produce the colored image. The lens system first simultaneously focuses all of the images of the respective squares 45, 48, 53 and 54 to form the virtual or aerial image 35. The virtual image is, in turn, brought to focus on the screen by the concave objective lens to form the object in natural color.

Figure 10:
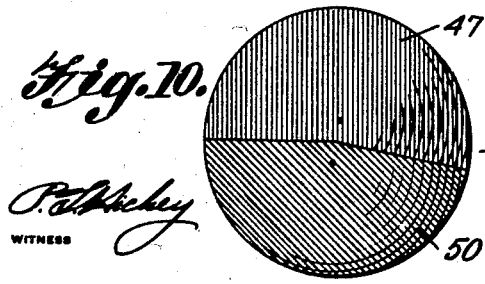
Fig. 10 is a view of a modified form of the combination lens.

The number of lens sectors of the combination lens may be varied and, obviously, the number of colors may be varied in direct accordance therewith. Fig. 10, for instance, illustrates a lens comprising only two segments. However, experience teaches that four lenses make an ideal combination since the entire rectangle of the film may be used. In any event, the filter or tinted lenses used preferably comprise the primary colors and these colors must be uniquely proportioned so that, if a blank film is projected through the optical system, the result will be a white screen.

The above-described optical system may be used equally well for standard or substandard motion picture film, stereopticon slides, for home portrait taking and viewing devices, in lithograph and separate color print and processes and for the broadcast and reception of television images in natural color. To avoid undesirable aberration, it is necessary that lens sectors be used instead of curved prisms and, to obtain the best results, it is imperative that the lens be formed of sectors in the manner illustrated rather than as a plurality of separate lenses. Where separate lenses are used, there is an unnecessary loss of light, objectionable parallax and difficulty in equalizing the exposure required by absorption of the various colors. It is necessary to use a front objective lens, which is a negative lens, to form the virtual image 35 at a fixed distance from the film; otherwise the image projected onto the screen will have to be the same distance from the projector as it was from the camera if proper focusing and superpositioning of the several images is to be satisfactorily accomplished.

This will be made clear by referring to the Figures 11 to 17, which show diagrammatically how the negative lens and the combined lens sectors produce the applicant's improved result. In Fig. 11 there is shown an ordinary convex lens L, an object AE and an image A'E' formed of the object by the lens, an aperture opening BC being used. Throughout this explanation only the point A will be projected, in order to keep the figures simple and clear. An object $A_1$ slightly out of focus, would be projected by the lens to the point $A_1'$, in back of the image plane and in the image plane a circle of confusion $x$ is produced. If the point $A_1'$ or the circle of confusion is projected through the lens L the point $A_1$ becomes an area of extent FD in the object plane. Note the increase in size of distance FD over the size of the circle of confusion. When the circle of confusion is large, the depth of focus is small or only the objects close to the object plane appear in good focus. Also throughout this description the object plane, the lens and the image plane will be considered to be fixed in their spacings relative to each other.

It is well realized by those skilled in this art that the size of the circle of confusion is decreased or the depth of focus is increased by reducing the aperture of the lens. Thus in Fig. 12 by reducing the aperture BC the circle of confusion produced by the point $A_1$ is much reduced. Here too, if the circle of confusion $x$ were projected back to the object plane a larger circle of confusion would result at A. It is well understood, as illustrated by Fig. 13, that so long as the aperture BC is fixed in size the circle of confusion produced by a point slightly out of focus will be the same size although it is shifted in the image plane if the aperture is at some other point on the lens than the center. Using two apertures BC and B'C', one on each side of the lens (Fig. 13) the total spacing of which is equal to the aperture BC in Fig. 11 two circles of confusion $z$ and $y$ are produced in the image plane which are spaced from each other by the diameter of the circle of confusion $x$ of Fig. 11. And if these circles of confusion $z$ and $y$ are projected to the object plane two circles are produced, one each at F and D. The circles at F and D are the images in the object plane resulting from the projection of the circles of confusion $y$ and $z$ through the two apertures B'C' and BC. That is, using the apertures at different parts of the lens L results in two images in the object plane displaced from each other on reprojection when the original object A' is out of focus, the circle F representing the image due to aperture B'C' and the circle D representing the image due to aperture BC. Projecting the base of the image (arrow) A' similarly results in two images displaced from each other. Accordingly, it is apparent that due to the two apertures at different points on the lens when the apertures are small, on reprojection, there are two images displaced from each other by an amount depending on the displacement of the apertures, the clarity of each image depending on the size of the aperture.

From Fig. 13 it is apparent that if the apertures BC and B'C' are moved progressively closer to each other the circles of confusion $z$ and $y$ move closer to each other until they merge into one circle of confusion when the two apertures coincide, whether at the center of the lens or at one side. Similarly the shift FD in the circles of confusion F and D in the object plane will be progressively reduced and will become zero, i. e., the circles at F and D will coincide to give one circle of confusion.

Referring now to Fig. 14 two lenses $L_1$ and $L_2$ are shown with their edges adjacent each other, and having, respectively, apertures BC and B'C' equal in size and equal to the aperture BC in Fig. 11. The point A forms two images, one for each lens, at points $A_2'$ and $A''$, respectively. A point $B_1$ slightly out of focus with the lenses produces out of focus images or circles of confusion in the image plane at $B_2'$ and $B''$. From the geometry of lenses as set forth in the previous descriptive material relating to Figs. 11 to 13, it follows that the distances $B_2'A_2'$ and $A''B''$ (diameters of circles of confusion) are equal respectively to the circle of confusion $x$ of Fig. 11 since the apertures BC and B'C' are the same size as aperture BC in Fig. 11. If $B_2'A_2'$ and $A''B''$ are projected to the object plane the image will extend over the distances AP and AR. That is, the projection of the circles of confusion $A_2'B_2'$ and $A''B''$ onto the object plane (reprojection of point $B_1$ which is out of focus) results in two images AP and AR displaced from each other. Applying the principle of Figs. 11 and 12 to Fig. 14 and reducing the apertures BC and B'C' but leaving them at the centers of the lens, the distance $B_2'A_2'$ will be reduced until $B_2'A_2'$ is equal to the diameter of the circle of confusion $x$ of Fig. 12 and similarly for the distance $A''B''$. Then in the object plane instead of having $A_2'B_2'$ and $A''B''$ projected as an image spread over the distance PR or two images AR and AP of the same point spaced side by side there will be two small circles of confusion at P and R, each one representing one image in the object plane of the out of focus point $B_1$. In other words the spacing PR of circles of confusion at P and R is an actual shift of the images or circles of confusion projected from $B_2'$ and $B''$ resulting from the out of focus point $B_1$. Note that the image shift PR is equal to $A_2'B_2'$ plus $A''B''$.

Applying the principle of Fig. 13 to Fig. 14, the apertures may also be shifted toward the common center of the two lenses G. This will progressively decrease the spacing between the circles of confusion at P and R until when the apertures coincide at the center of the lenses G the circles of confusion P and R coincide at A to give one circle of confusion and the shift of the images projected from $B_2'$ and $B''$ is reduced to zero and only the circle of confusion remains. By making the aperture small the circle of confusion becomes negligible. Changing the spacing between apertures in a multiple lens system is analogous to decreasing the aperture in a simple lens system.

In the projection of an image formed by a lens back through the lens to what was the object plane in a simple lens arrangement such as shown in Fig. 12, the circle of confusion may easily be made small enough to neglect. And in a multiple lens arrangement such as shown in Fig. 14 the circle of confusion may be made small by using a small aperture. But the fact that the lenses are displaced from each other causes two images to be formed in the image plane. These images are displaced from each other. Now if the images are reprojected by the same multilens system, it follows from the relationship of images and object planes already described, that even though the circle of confusion is negligible the images in the object plane of objects slightly out of focus are shifted relative to each other unless the apertures for each lens are coincident in one aperture for both lenses, the aperture using the same portion of each lens. Thus in a multilens system it is important to have only one aperture for all lenses, as well as having that aperture a small one to give good depth of focus. When this is done in Fig. 14 by an aperture MN, it is seen that only the narrow thin edges of the lenses are used. At this point of the lenses the spherical aberration is greatest and a lens is almost useless, especially when considering the exactitude required by the color process, and the images cannot be properly superimposed to give a clear image.

Recalling from Figs. 12 and 13 that the apertures may be shifted over the lens surface without varying the size of the circle of confusion, then it will be apparent that the lenses $L_1$ and $L_2$ may be changed in size but not in characteristics so as to bring the optical centers of the lenses together as shown in Fig. 15. This will bring the images in the image plane closer together, which is an important advantage since it reduces the size of the film to be used, and by using the central portion of the lenses the aberration is reduced to a negligible value. It is important that in bringing the optical centers of the lenses together the optical center of each lens be spaced the same distance from the juncture of the lenses as the optical centers of the other lenses. If this is not done an image shift will occur when the images are projected through the lens system to the object plane.

In Fig. 16 the two reduced lenses are shown with the circles of confusion caused by a point slightly out of focus in the original film. Note that the circle of confusion in the object plane is only one circle and thus there is no image shift. This will be true only if the optical centers of the lens sectors are equally spaced from the geometrical center or principal center and if one aperture is used the center of which is on the geometrical center of the lens combination.

It will be realized that the foregoing analysis is based on the presumption that some objects slightly out of focus with the lens will distort a picture unless the lens has a great depth of focus. If all objects are perfectly in focus there is no need for a small aperture and the complete lens can be used.

The preceding description of operation is all based on having a fixed relation of image plane, lens, and object plane. Thus if an object is photographed at one foot or two miles, for example, the final image projection must be made at one foot or two miles. This is an impossibility, and to keep the fixed relation of image plane, lens, and object plane a negative or concave lens 29 is used in front of the plurality of lenses 23. Referring to Fig. 17, it is seen that the concave lens 29 produces a virtual image which can always be focused to exist at a fixed distance in front of the lens sectors. The lens sectors then form real images in the image plane from the virtual image formed by the concave lens. Therefore, using the concave lens to produce a virtual image, the relationship of a fixed distance between the object plane, lens, and image plane is maintained and a desirable result is achieved, that of clear pictures. In projecting the picture from a positive, the concave lens will produce a real image at any desired point in front of the lens.

In Fig. 14 the angle between the lines $B_1B_2'$ and $AA_2'$ is also referred to as parallax. By using a small aperture, this parallax or its twin, the circle of confusion, is reduced to a small value. In a plural lens system such as described, the shift of the images of objects slightly out of focus is the equivalent of parallax or the circle of confusion. To produce an acceptable final image from a multiplicity of lenses, the image shift then can be no greater than the parallax or circle of confusion in a simple lens. This is accomplished by using the same aperture for all of the lenses and having that aperture cover the same relative part of each lens. The smaller the aperture the greater is the depth of focus and the smaller is the image shift or parallax. The rays of light extending from the virtual image of Fig. 17 diverge as they pass through the concave lens to the lens sectors and hence to the image plane. The fact that these rays are divergent causes a decrease in the effective aperture, thereby further decreasing the image shift or parallax.

While in the Figs. 14 to 17 only two lenses are shown in the combination lens, as many as are desirable may be used so long as the optical centers are equally spaced from the geometric center. As shown in Fig. 1 four images are produced and the negative lens in reproducing the pictures will produce a real image of the four images which are superimposed on each other in the virtual image.

While a particular embodiment of the invention has been shown it will be understood, of course, that the invention is not limited thereto since many modifications may be made and it is, therefore, contemplated by the appended claims to cover any such modifications as come within the true spirit and scope of the invention.

Having thus described the invention what is claimed and desired to be secured by Letters Patent is:

1. Photographic apparatus comprising a film plane, a concave lens spaced in front of said film plane for forming a virtual image of an object at substantially an invariant distance in front of said film plane, a combination lens spaced between said film plane and said concave lens consisting of a plurality of convex lens sectors of the same refractive character having their apexes adjoining each other and their edges contiguous with each other along the full length thereof for forming a plurality of separate real images of said virtual image, each of said lens sectors including an optical center adjacent its apex, said combination lens having its geometrical center disposed on the axis of said concave lens and having said optical centers equidistant from said geometrical center, and an iris diaphragm having an opening symmetrically disposed with reference to said geometrical center, said diaphragm opening cooperating with the apexes of said sectors irrespective of the size of said diaphragm opening whereby image distortion is substantially prevented.

2. Photographic apparatus comprising a film plane, a concave lens for forming a virtual image at substantially an invariant distance in front of said film plane, a combination lens spaced between said concave lens and said film plane at a fixed distance from said film plane, said combination lens consisting of a plurality of convex lens sectors of the same refractive character having their apexes adjoining each other and their edges contiguous with each other along the full length thereof for forming a plurality of separate real images in said film plane of said virtual image, each of said lens sectors including an optical center adjacent its apex, said combination lens having its geometrical center disposed on the axis of said concave lens, said optical centers being equidistant from said geometrical center and spaced therefrom by a distance whereby said separate real images are completely separated from each other by a minimum distance, and an iris diaphragm having an opening symmetrically disposed with reference to said geometrical center, said diaphragm opening cooperating with the apexes of said sectors irrespective of the size of the diaphragm opening whereby spherical aberration of the image in the image plane is substantially prevented.

3. Photographic apparatus comprising a film plane, a concave lens for forming a virtual image at substantially an invariant distance in front of said film plane, a combination lens spaced between said concave lens and said film plane at a fixed distance from said film plane, said combination lens consisting of a plurality of convex lens sectors of the same refractive character having their apexes adjoining each other and their edges contiguous with each other along the full length thereof for forming a plurality of separate real images in said film plane of said virtual image, each of said lens sectors including an optical center adjacent its apex, said combination lens having its geometrical center disposed on the axis of said concave lens, said optical centers being equidistant from said geometrical center and arranged at the corners of a quadrilateral of the same relative size as one of said real images, and an iris diaphragm having an opening symmetrically disposed with reference to said geometrical center, said diaphragm opening cooperating with the apexes of said sectors irrespective of the size of the diaphragm opening whereby spherical aberration of the image in the image plane is substantially prevented.

4. Photographic apparatus comprising a film plane, a concave lens for forming a virtual image at substantially an invariant distance in front of said film plane, a combination lens spaced between said concave lens and said film plane at a fixed distance from said film plane, said combination lens consisting of a plurality of convex lens sectors of the same refractive character having their apexes adjoining each other and their edges contiguous with each other along the full length thereof for forming a plurality of separate real images in said film plane of said virtual image, each of said lens sectors including an optical center adjacent its apex, said combination lens having its geometrical center disposed on the axis of said concave lens, said optical centers being equidistant from said geometrical center and spaced therefrom by a distance whereby said separate real images are completely separated from each other by a minimum distance, individual color filter means associated with each of said lens sectors, and an iris diaphragm having an opening symmetrically disposed with reference to said geometrical center, said diaphragm opening cooperating with the apexes of said sectors irrespective of the size of the diaphragm opening whereby spherical aberration of the image in the image plane is substantially prevented.

5. Photographic apparatus comprising a film plane, a concave lens for forming a virtual image at substantially an invariant distance in front of said film plane, a combination lens spaced between said concave lens and said film plane at a fixed distance from said film plane, said combination lens consisting of a plurality of convex lens sectors of the same refractive character having their apexes adjoining each other and their edges contiguous with each other along the full length thereof for forming a plurality of separate real images in said film plane of said virtual image, each of said lens sectors including an optical center adjacent its apex, said combination lens having its geometrical center disposed on the axis of said concave lens, said optical centers being equidistant from said geometrical center and spaced therefrom by a distance whereby said separate real images are completely separated from each other by a minimum distance, individual color filter means associated with each of said lens sectors, the areas of said individual color filter means and the areas of the corresponding lens sectors being in inverse ratio to the apparent light intensity as registered on a sensitive film, and an iris diaphragm having an opening symmetrically disposed with reference to said geometrical center, said diaphragm opening cooperating with the apexes of said sectors irrespective of the size of the diaphragm opening whereby spherical aberration of the image in the image plane is substantially prevented.

6. Photographic apparatus comprising a film plane, a concave lens for forming a virtual image at substantially an invariant distance in front of said film plane, a combination lens spaced between said concave lens and said film plane at a fixed distance from said film plane, said combination lens consisting of a plurality of convex lens sectors of the same refractive character having their apexes adjoining each other and their edges contiguous with each other along the full length thereof for forming a plurality of separate real images in said film plane of said virtual image, each of said lens sectors including an optical center adjacent its apex, said combination lens having its geometrical center disposed on the axis of said concave lens, said optical centers being equidistant from said geometrical center and arranged at the corners of a quadrilateral of the same relative size as one of said real images, individual color filter means associated with each lens sector, the areas of said individual color filter means and the areas of the corresponding lens sectors being in inverse ratio to the apparent light intensity as registered on a sensitive film, and an iris diaphragm having an opening symmetrically disposed with reference to said geometrical center, said diaphragm opening cooperating with the apexes of said sectors irrespective of the size of the diaphragm opening whereby spherical aberration of the image in the image plane is substantially prevented.

ELLIS DONALD GOODWIN.

REFERENCES CITED

The following references are of record in the file of this patent:

UNITED STATES PATENTS

| Number | Name | Date |
| --- | --- | --- |
| 1,840,931 | Bjorn | Jan. 12, 1932 |
| 1,843,642 | Kienast | Feb. 2, 1932 |
| 1,921,918 | Goodwin | Aug. 8, 1933 |
| 2,017,190 | Walde | Oct. 15, 1935 |
| 1,843,663 | Cregier | Feb. 2, 1932 |
| 2,200,466 | Cristiani et al. | May 14, 1940 |

FOREIGN PATENTS

| Number | Country | Date |
| --- | --- | --- |
| 251,018 | Great Britain | Apr. 22, 1926 |